(12) United States Patent
Falko et al.

(10) Patent No.: US 12,326,787 B1
(45) Date of Patent: Jun. 10, 2025

(54) METHODS AND SYSTEMS FOR STATEFUL WORKFLOW EXECUTION

(71) Applicant: Salesforce, Inc., San Francisco, CA (US)

(72) Inventors: Andrey Falko, San Francisco, CA (US); Tommy Page Odom, Raleigh, NC (US)

(73) Assignee: Salesforce, Inc.

( * ) Notice: Subject to any disclaimer, the term of this patent is extended or adjusted under 35 U.S.C. 154(b) by 0 days.

(21) Appl. No.: 18/426,252

(22) Filed: Jan. 29, 2024

(51) Int. Cl.
*G06F 11/10* (2006.01)
*G06F 11/14* (2006.01)

(52) U.S. Cl.
CPC ...... *G06F 11/1451* (2013.01); *G06F 2201/84* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |

(Continued)

*Primary Examiner* — Jau Shya Meng
(74) *Attorney, Agent, or Firm* — Lorenz & Kopf, LLP

(57) ABSTRACT

Computing systems and methods are provided for executing steps of a workflow in a stateful and parallelizable manner. A worker computing system receives indication of an assigned step of the workflow and downloads, to its local storage, a snapshot of changes from a preceding step of the workflow from a distributed storage on a network, where the snapshot includes data indicative of the changes associated with execution of the preceding step. The worker computing system performs the assigned step using the data from the snapshot to generate a second snapshot of changes associated with execution of the assigned step and uploads the second snapshot of changes associated with the assigned step to the distributed storage.

20 Claims, 7 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,836,110 B2 * | 12/2023 | Matsushita ............ G06F 16/128 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0347552 A1 * | 12/2015 | Habouzit ............... G06F 16/178 |
| | | 707/613 |
| 2024/0094937 A1 * | 3/2024 | Kashi Visvanathan ...... |
| | | G06F 3/061 |

\* cited by examiner

METHODS AND SYSTEMS FOR STATEFUL WORKFLOW EXECUTION

TECHNICAL FIELD

One or more implementations relate to the field of database systems, and more specifically, to methods and systems that provide stateful execution for workflow parallelization.

BACKGROUND

Modern software development has evolved towards web applications and cloud-based applications that provide access to data and services via the Internet or other networks. Modern software development often employs testing in order to eliminate as many errors or "bugs" as possible before the software is released for widespread use. Automated software testing techniques are often utilized to verify that a program performs consistent with its specified or intended behavior. Continuous integration (CI) is a software development practice in which developers regularly integrate their code changes into a source code repository. To ensure that the new code does not introduce bugs, automated builds and tests run before or after developers check in their changes.

Source code for a new or updated application (or feature thereof) can be relatively voluminous, and include thousands or millions of lines of code to be compiled before being tested, packaged, scanned, published and/or the like prior to deployment. While autobuild systems or other continuous integration/continuous deployment (CI/CD) pipelines may automate or otherwise facilitate deployment of source code, performing the steps of a development or deployment workflow in a serial manner can be time consuming and undesirably delay deployment. For example, a CI system may be responsible for creating packages and files created during compilation, but errors, anomalies or other incidents arising out of a latter portion of the source code may result in the CI system compiling and/or processing a substantial portion of the source code before any incident arises, thereby consuming that intervening period of time for an ultimately unsatisfactory outcome, that itself, requires additional time for debugging and resolution.

Parallelization is a technique for reducing computation time, but can be difficult when steps are dependent on a preceding step or carryover of an execution state of a preceding step for execution of a subsequent step. While various file systems exist to support distributed storage, the performance of distributed file storage can suffer with respect to tasks or steps that involve a lot of reads, writes, or other disk input/output (I/O) operations. Additionally, parallelization increases the risk of data corruption from parallel steps modifying the same data or objects, which would negate benefits of parallelization by producing a potentially corrupted or unreliable result. Accordingly, it is desirable to provide systems and methods capable of parallelizing workflows in a more efficient manner that is less susceptible to data corruption.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
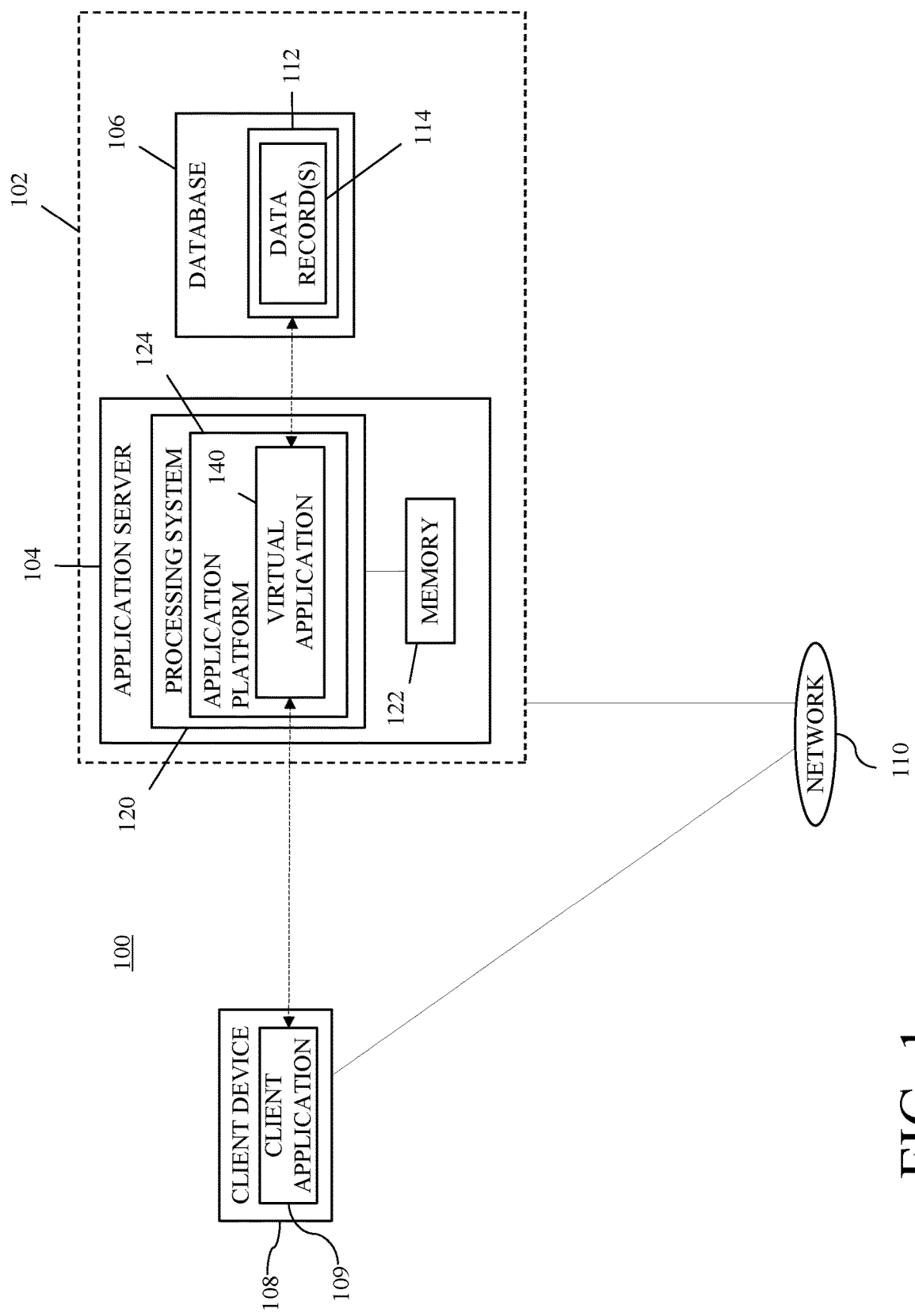
FIG. 1 is a block diagram depicting an exemplary computing system depicting an environment suitable for implementing aspects of the subject matter described herein in accordance with one or more implementations.

The subject matter described herein generally relates to computing systems and methods for efficiently executing of a user-defined workflow in a stateful and parallelizable manner while detecting and mitigating potential conflicts or other data corruption. As described in greater detail below, in exemplary implementations, the user-defined workflow generally identifies a subject to be processed in connection with the workflow (e.g., source code, a file, or another object for processing) along with configuration information that identifies the sequence and manner in which the subject is to be processed. The execution of the workflow is then distributed across different worker nodes for processing the subject in serial or parallel in accordance with the configuration information, with the different worker nodes performing or executing their respective assigned subset of the workflow using local storage for improved performance before uploading or otherwise sharing data indicative of the changes associated with its respective subset of the workflow back to the other worker nodes via distributed storage to allow each of the worker nodes to perform their respective assigned subset of the workflow in a stateful manner by incorporating or otherwise referencing the changes associated with preceding execution of preceding subsets of the workflow.

In one or more exemplary implementations, a workflow includes or is otherwise realized as an instruction file that is uploaded or otherwise imported to a continuous integration (CI) system that includes or otherwise identifies the source code, file or other subject of the workflow to be processed along with workflow execution configuration metadata that identifies the user-defined steps for processing the subject, the user-defined sequence in which those user-defined steps are to be performed and whether or not the respective steps are capable of being executed in parallel. For example, the user-defined workflow may include a directed acyclic graph data structure (which may be configured by the user using a graphical user interface (GUI) display), where nodes of the graph data structure correspond to the different steps of the workflow, where each step represents a unit of work that is a subset of the subject of the workflow (e.g., a block of source code). In various implementations, a user-defined step may also include data or information identifying an image where the commands associated with the step are to be run (e.g., which could be a container image, a virtual machine image, an operating system image or other tool chain that is able to execute, process commands, and write results to storage), where the commands are instructions in a language that the image supports (e.g., shell commands using a shell language or other suitable programming language).

In exemplary implementations, a central controller of the CI system assigns the individual steps of the user-defined workflow to different worker computing system nodes for processing and execution in accordance with the user-defined workflow execution configuration metadata. A respective worker computing system receives indication of an assigned step of the workflow from the central controller and downloads, from a distributed storage on the network to its own local storage at the respective worker computing system, snapshots of changes corresponding to any preceding steps of the workflow. In this regard, each snapshot generally represents a changelog that includes data indicative of the respective changes to a respective set of one or more objects (e.g., files such as compiled binaries, test result reports, generated test files and/or the like) associated with execution of the respective preceding step prior to execution of the current assigned step. The worker computing system utilizes the snapshots from any preceding steps to initialize its local workspace implemented using its local storage to reflect the current execution state of the workflow after completion of the preceding steps before performing its assigned step in a manner that then utilizes or otherwise reflects the respective changes to the various objects associated with the preceding step(s) to ultimately generate its own snapshot of changes to one or more objects associated with execution of the assigned step. The snapshot of changes associated with execution of the assigned step are uploaded by the respective worker computing system from its local storage back to the distributed storage on the network for subsequent retrieval by one or more worker computing systems executing one or more subsequent steps of the workflow. In this manner, the respective changes with the respective steps are shared or otherwise maintained across the different worker computing systems via the distributed storage to allow each of the different worker computing systems to execute their respective assigned steps in a manner that reflects the changes associated with preceding steps while using local storage for improved performance (e.g., faster read and write operations relative to distributed storage). In this regard, by distributing snapshots across workers, each step can be executed locally for improved performance with respect to reads, writes, and other disk I/Os, while providing the ability to implement the local workspace and execute the assigned step within the context of that local workspace in a stateful manner that reflects the execution of the preceding steps, without having to rely on the distributed storage for disk I/Os during the execution of an assigned step.

In exemplary implementations, prior to executing an assigned step of a workflow at a worker computing system, the worker computing system analyzes the respective data associated with the snapshots corresponding to the preceding steps of the workflow that were downloaded to its local storage to detect or otherwise identify a conflict or other potential data corruption by identifying when a snapshot associated with execution of a particular step of the workflow includes a first change to a particular object that matches or otherwise corresponds to a second change to that same common object in a second snapshot associated with execution of a different step of the workflow in parallel with that particular step. In this regard, when a worker computing system identifies a potential conflict between two preceding steps, the worker computing system may automatically initiate one or more remedial actions to mitigate any potential data corruption. For example, a user notification may be automatically generated and pushed to a client device associated with the user who submitted the workflow that identifies the step when and where the conflict was detected, the object(s) associated with the conflict, the preceding steps associated with the conflict, and the like. The user can review the information contained in the user notification to modify the workflow execution configuration information to modify the preceding steps to resolve or otherwise mitigate the conflict, thereby reducing the amount of time required to debug the workflow. Thereafter, when the modified workflow is resubmitted to the CI system for execution, in some implementations, the snapshots associated with any steps preceding those modified steps may be utilized by the modified and subsequent steps to complete execution of the modified workflow without having to repeat those preceding steps, thereby reducing the amount of time required to complete execution of the modified workflow.

FIG. 1 depicts an exemplary depicts an exemplary computing system 100 including a database system 102 configurable to provide an application platform 124 capable of concurrently providing instances of one or more virtual applications 140 to client applications 109 at client devices 108 associated with one or more different end users over a communications network 110 (e.g., the Internet or any sort or combination of wired and/or wireless computer network, a cellular network, a mobile broadband network, a radio network, or the like). In this regard, in some implementations, the subject matter described herein may be implemented in the context of a workflow for processing source code or other computer-executable code for the application platform 124, a virtual application 140, a custom application supported by the application platform 124 and/or the virtual application 140, a custom application extension to be incorporated with and/or supported by the application platform 124 and/or the virtual application 140, or other code suitable for execution within the computing system 100. That said, it should be appreciated that FIG. 1 is a simplified representation of a computing system 100 and is not intended to be limiting, and the subject matter described herein is not limited to source code or any particular subject of a workflow or the computing system 100 depicted in FIG. 1.

In one or more exemplary implementations, the database system 102 includes one or more application servers 104 that support an application platform 124 capable of providing instances of virtual web applications 140, over the network 110, to any number of client devices 108 that users may interact with to view, access or obtain data or other information from one or more data records 114 maintained in one or more data tables 112 at a database 106 or other repository associated with the database system 102. For example, a database 106 may maintain, on behalf of a user, tenant, organization or other resource owner, data records 114 entered or created by that resource owner (or users associated therewith), files, objects or other records uploaded by the resource owner (or users associated therewith), and/or files, objects or other records automatically generated by one or more computing processes (e.g., by the server 104 based on user input or other records or files stored in the database 106). In this regard, in one or more implementations, the database system 102 is realized as an on-demand multi-tenant database system that is capable of dynamically creating and supporting virtual web applications 140 based upon data from a common database 106 that is shared between multiple tenants, which may alternatively be referred to herein as a multi-tenant database. Data and services generated by the virtual web applications 140 may be provided via the network 110 to any number of client devices 108, as desired, where instances of the virtual web application 140 may be suitably generated at run-time (or on-demand) using a common application platform 124 that securely provides access to the data in the database 106 for each of the various tenants subscribing to the multi-tenant system.

The application server 104 generally represents the one or more server computing devices, server computing systems or other combination of processing logic, circuitry, hardware, and/or other components configured to support remote access to data records 114 maintained in the data tables 112 at the database 106 via the network 110. Although not illustrated in FIG. 1, in practice, the database system 102 may include any number of application servers 104 in concert with a load balancer that manages the distribution of network traffic across different servers 104 of the database system 102.

In exemplary implementations, the application server 104 generally includes at least one processing system 120, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 104 may also include one or more communications interfaces, which include any number of transmitters, receivers, transceivers, wired network interface controllers (e.g., an Ethernet adapter), wireless adapters or other suitable network interfaces that support communications to/from the network 110 coupled thereto. The application server 104 also includes or otherwise accesses a data storage element 122 (or memory), which may be realized as a local disk, hard disk, random access memory (RAM), read only memory (ROM), flash memory, magnetic or optical mass storage, or any other suitable non-transitory short or long term data storage or other computer-readable media, and/or any suitable combination thereof. In exemplary implementations, the memory 122 stores code or other computer-executable programming instructions that, when executed by the processing system 120, are configurable to cause the processing system 120 to support or otherwise facilitate the application platform 124 and related software services that are configurable to support the subject matter described herein.

The client device 108 generally represents an electronic device coupled to the network 110 that may be utilized by a user to access an instance of the virtual web application 140 using an application 109 executing on or at the client device 108. In practice, the client device 108 can be realized as any sort of personal computer, mobile telephone, tablet or other network-enabled electronic device coupled to the network 110 that executes or otherwise supports a web browser or other client application 109 that allows a user to access one or more GUI displays provided by the virtual web application 140. In exemplary implementations, the client device 108 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 108. Some implementations may support text-to-speech, speech-to-text, or other speech recognition systems, in which case the client device 108 may include a microphone or other audio input device that functions as the user input device, with a speaker or other audio output device capable of functioning as an output device. The illustrated client device 108 executes or otherwise supports a client application 109 that communicates with the application platform 124 provided by the processing system 120 at the application server 104 to access an instance of the virtual web application 140 using a networking protocol. In some implementations, the client application 109 is realized as a web browser or similar local client application executed by the client device 108 that contacts the application platform 124 at the application server 104 using a networking protocol, such as hypertext transport protocol secure (HTTPS). In this manner, the client application 109 may be utilized to access or otherwise initiate an instance of a virtual web application 140 hosted by the database system 102, where the virtual web application 140 provides one or more web page GUI displays within the client application 109 that include GUI elements for interfacing and/or interacting with records 114 maintained at the database 106.

In exemplary implementations, the database 106 stores or otherwise maintains data for integration with or invocation by a virtual web application 140 in objects organized in object tables 112. In this regard, the database 106 may include any number of different object tables 112 configured to store or otherwise maintain alphanumeric values or other descriptive information that define a particular instance of a respective type of object associated with a respective object table 112. For example, the virtual application may support a number of different types of objects that may be incorporated into or otherwise depicted or manipulated by the virtual application, with each different type of object having a corresponding object table 112 that includes columns or fields corresponding to the different parameters or criteria that define a particular instance of that object. In some implementations, the database 106 stores or otherwise maintains application objects (e.g., an application object type) where the application object table 112 includes columns or fields corresponding to the different parameters or criteria that define a particular virtual web application 140 capable of being generated or otherwise provided by the application platform 124 on a client device 108. In this regard, the database 106 may also store or maintain graphical user interface (GUI) objects that may be associated with or referenced by a particular application object and include columns or fields that define the layout, sequencing, and other characteristics of GUI displays to be presented by the application platform 124 on a client device 108 in conjunction with that application 140.

In exemplary implementations, the database 106 stores or otherwise maintains additional database objects for association and/or integration with a virtual web application 140, which may include custom objects and/or standard objects. For example, an administrator user associated with a particular resource owner may utilize an instance of a virtual web application 140 to create or otherwise define a new custom field to be added to or associated with a standard object, or define a new custom object type that includes one or more new custom fields associated therewith. In this regard, the database 106 may also store or otherwise maintain metadata that defines or describes the fields, process flows, formulas, business logic, structure and other database components or constructs that may be associated with a particular application database object. In various implementations, the database 106 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with rules or logical criteria associated with respective types of database object types that define actions, triggers, or other logical criteria or operations that may be performed or otherwise applied to entries in the various database object tables 112 (e.g., in response to creation, changes, or updates to a record in an object table 112).

Figure 2:
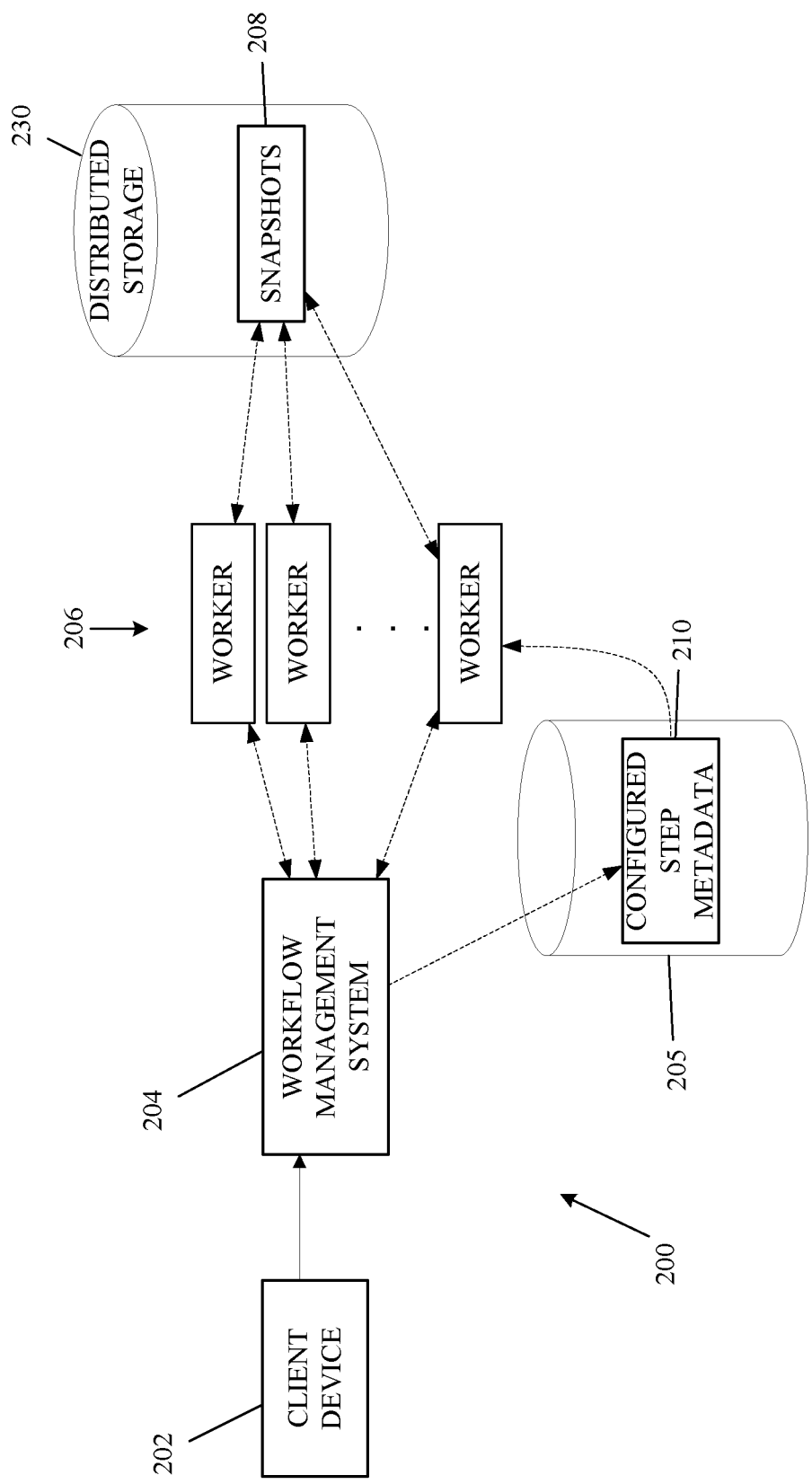
FIG. 2 is a schematic block diagram of an exemplary continuous integration (CI) system suitable for use with the computing system of FIG. 1 in accordance with one or more implementations.

FIG. 2 depicts an exemplary implementation of a continuous integration (CI) system 200 for executing a workflow suitable for implementation in connection with the computing system 100 of FIG. 1. For example, the workflow may include a sequence of steps for compiling, testing, packaging, scanning and publishing source code (e.g., to an autobuild system, a production environment, and/or the like). In this regard, a developer or other user may utilize a client application (e.g., client application 109) at a client device 202 (e.g., client device 108) to upload, input or otherwise provide a user-defined workflow that includes or otherwise identifies the source code (e.g., by specifying a data record 114 or other location on the network 110 where the source code can be obtained) along with workflow execution configuration metadata that identifies the sequence and manner for the user-defined steps in which the source code is to be processed. For example, the user may define one or more compilation steps to be performed in parallel, followed by one or more testing steps to be performed in parallel with one another after execution of compilation steps, followed by any number of additional packaging, security scanning and/or publishing steps, such as, for example, publishing test results, artifacts for deployment systems, artifacts for other tests, artifacts for use as reusable libraries and/or the like.

The user-defined workflow is uploaded, transmitted or otherwise provided over a network to a workflow management system 204 that generally represents the central controller associated with the CI system 200 that is responsible for managing execution of the workflow. As described in greater detail below, the workflow management system 204 utilizes the workflow execution configuration metadata to assign the user-defined steps of the workflow to different ones of any number of available worker computing systems 206 (or worker nodes) for execution of the respective assigned steps in the user-defined sequence in the user-defined manner. In this regard, the workflow management system 204 generally represents a server computing device, server computing system or other hardware that includes at least one processing system and data storage storing code or other computer-executable programming instructions that, when executed by the processing system, are configurable to cause the workflow management system 204 to support the subject matter described herein. In the illustrated implementation, the workflow management system 204 stores or otherwise maintains the workflow execution configuration metadata that defines the user-configured steps of the workflow in a data storage element 205 as configured step metadata 210 that is readable or otherwise accessible by the worker computing systems 206 in connection with execution of an assigned step of the workflow.

The worker computing systems 206 generally represent the different computing devices, computing systems or other hardware that are distinct and separate from the workflow management system 204 and configurable to execute an assigned step of the workflow as described in greater detail below. In exemplary implementations, each of the worker computing systems 206 is communicatively coupled to a distributed storage element 230 on a network, such as an object storage system, that allows each of the worker computing systems 206 to independently read from and/or write to the distributed storage element 230. As described in greater detail below, prior to execution of an assigned step of the workflow, a respective worker computing system 206 accesses the distributed storage element 230 to download or otherwise retrieve, from the distributed storage element 230 over the network, one or more snapshots 208 of changes associated with execution of one or more preceding steps of the workflow by one or more of the worker computing systems 206. The respective worker computing system 206 utilizes the snapshots 208 of changes from the preceding steps to initialize its local workspace implemented using its local storage to reflect the current execution state of the workflow after completion of the preceding steps before performing its assigned step consistent with the current execution state of the workflow after completion of the preceding steps. Thereafter, the respective worker computing system 206 uploads changes from execution of its assigned step from its local storage back to the distributed storage element 230 over the network for subsequent access and retrieval by one or more of the worker computing systems 206 in connection with execution of subsequent steps of the workflow.

Figure 3:
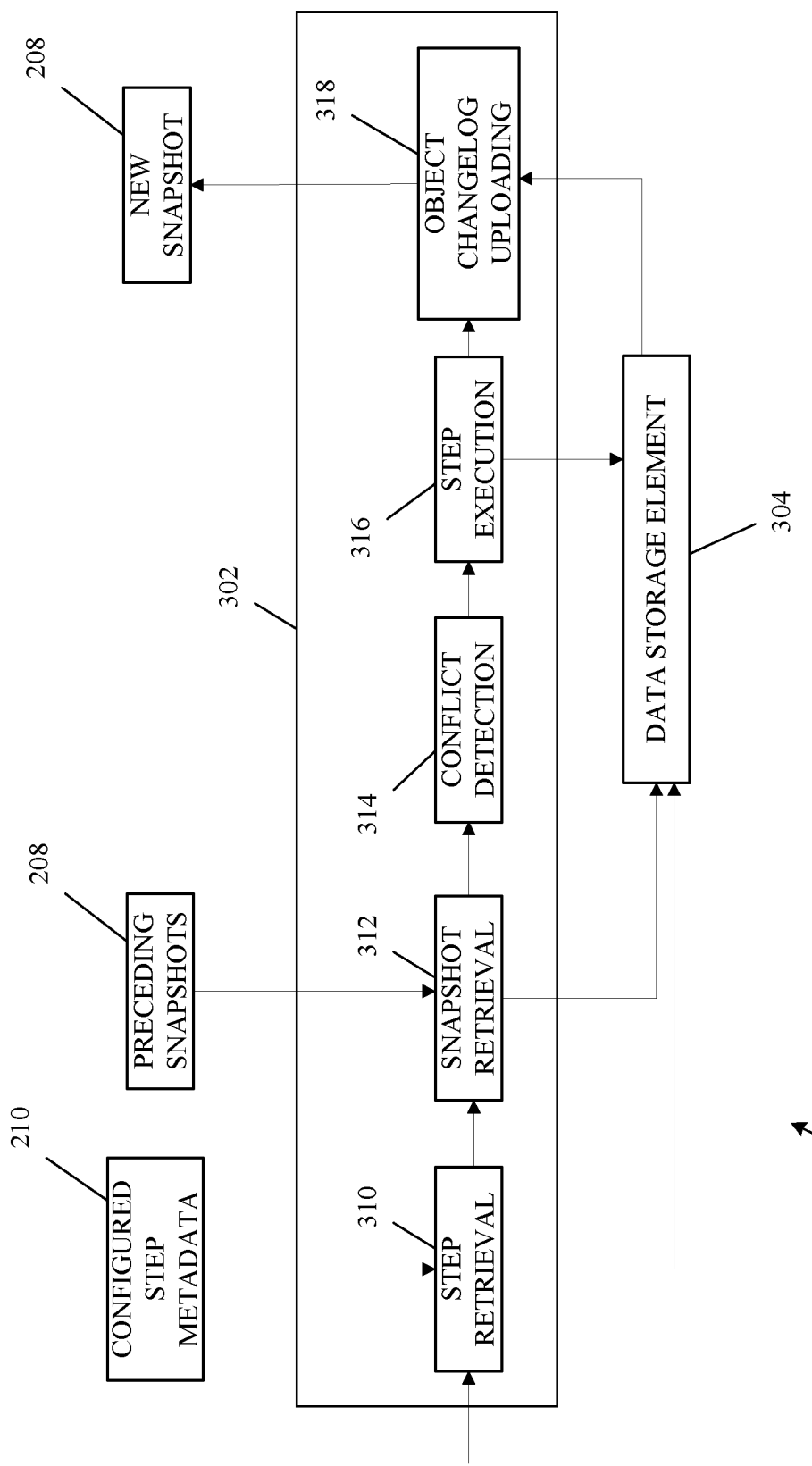
FIG. 3 is a schematic block diagram of an exemplary worker computing system suitable for use with the CI system of FIG. 2 in accordance with one or more exemplary implementations.

FIG. 3 depicts an exemplary implementation of a worker computing system 300 suitable for use as a worker computing system 206 in the CI system 200 of FIG. 2. The worker computing system 300 includes at least one processing system 302 that is coupled to a local data storage element 304 at the worker computing system 300. In this regard, the local data storage element 304 may store code or other computer-executable programming instructions that, when executed, are configurable to cause the processing system 302 to implement various software services or components that are configurable to support the subject matter described herein.

Referring to FIG. 3 with continued reference to FIG. 2, in exemplary implementations, the processing system 302 at the worker computing system 300 includes a step retrieval service 310 that generally represents the process, service or other software component at the worker computing system 300 that is configurable to receive information or other indication of an assigned step of the workflow to be executed by the worker computing system 300 from the workflow management system 204 and download or otherwise retrieve the configured step metadata 210 for the assigned step. For example, the workflow management system 204 may transmit or otherwise provide an instruction or command to the step retrieval service 310 that includes information identifying the particular record or entry of configured step metadata 210 in the data storage 205 to be executed by the worker computing system 300. The step retrieval service 310 utilizes the information identifying the assigned step to retrieve or otherwise obtain the configured step metadata 210 for the assigned step and any other information or data required for executing the assigned step from the data storage 205 or another location on the network. For example, in some implementations, the source code, file or other subject of the workflow may be stored or otherwise maintained in the data storage 205 or another location on a network (e.g., in a data record 114 at the database system 106) and downloaded to the local data storage element 304 in connection with downloading the configured step metadata 210.

The illustrated worker computing system 300 includes a snapshot retrieval service 312 that generally represents the process, service or other software component executed by the processing system 302 that is configurable to utilize the configured step metadata 210 for the assigned step to download or otherwise retrieve snapshots 208 from any preceding steps from the distributed storage element 230 to the local data storage element 304. In this regard, the configured step metadata 210 may include information identifying the particular workflow that the respective step is associated with along with the preceding steps associated with that workflow that are required to be completed in accordance with the user-defined sequence prior to execution of the assigned step. The snapshot retrieval service 312 utilizes the information identifying the preceding steps to locate and retrieve the corresponding snapshots 208 for those preceding steps from the distributed storage element 230 and write the downloaded snapshots 208 to the local data storage element 304. For example, based on the particular workflow and/or step identifiers, the snapshot retrieval service 312 may be configurable to identify the particular path or location in the distributed object storage element 230 from where the snapshots 208 for preceding steps of that workflow can be obtained. In this regard, in some implementations, the workflow management system 204 may inject commands or instructions into the respective steps of the workflow that include pointers or other identifiers for retrieving the respective objects from the distributed storage element 230 corresponding to the archive files for the snapshots 208 of preceding steps with corresponding commands or instructions to download those objects and write those snapshots 208 of preceding steps (e.g., the files, objects or other contents of the archive files) to block storage at the local data storage element 304.

In exemplary implementations, the worker computing system 300 also implements a conflict detection service 314 that generally represents the process, service or other software component executed by the processing system 302 that is configurable to analyze the downloaded snapshots 208 in the local data storage element 304 to detect or otherwise identify a conflict condition when a downloaded snapshot 208 for a preceding step includes data indicative of a change to a particular object that is common to the downloaded snapshot 208 for another preceding step that indicates a change to that same common object by that other preceding step that was executed in parallel to the other preceding step. In this regard, the conflict detection service 314 may utilize the configured step metadata 210 to identify any preceding steps that were executed in parallel and then analyze the downloaded snapshots 208 associated with those parallel preceding steps to identify when those snapshots 208 each include data indicative of changes to a common object. In exemplary implementations, when the conflict detection service 314 identifies a conflict condition, the worker computing system 300 terminates execution of the assigned step and provides a corresponding indication to the workflow management system 204 that includes information identifying the particular object(s) associated with the conflict and/or the particular parallel steps associated with the conflict.

In the absence of any conflicts between preceding steps, a step execution service 316 at the worker computing system 300 utilize the configured step metadata 210 associated with the assigned step to execute or otherwise perform the assigned step as defined by the user. For example, when the assigned step corresponds to compiling a particular subset of lines of source code, the step execution service 316 may utilize the downloaded snapshots 208 to initialize a local workspace that reflects compilation of any preceding lines of source code prior to compiling the assigned lines of source code in a manner that reflects any changes to any underlying objects associated with the source code made by preceding steps of the workflow. In this regard, in connection with executing the assigned step, the step execution service 316 may make changes to one or more objects that were previously changed by a preceding step and/or make changes to one or more objects that are influenced by previous changes to other objects that were previously changed by a preceding step.

After completing execution of the assigned step, an object changelog uploading service 318 at the worker computing system 300 analyzes the objects maintained in the local data storage element 304 to detect or otherwise identify a set of one or more objects that were changed or modified in connection with execution of the assigned step, generate a corresponding snapshot 208 for the assigned step that includes data indicative of the changes to that set of objects associated with the assigned step, and then uploads, writes or otherwise transmits the new snapshot 208 indicative of changes to that set of objects by the assigned step to the distributed storage element 230. For example, the changed objects associated with the assigned step may be realized as compiled binaries, test result reports, generated test files and/or other files created or modified during execution of the assigned step that may be aggregated or otherwise combined into an archive file snapshot 208 having an archive file format (e.g., .zip, .tar and/or the like) that is then uploaded and stored at the distributed storage element 230. In exemplary implementations, the object changelog uploading service 318 utilizes timestamps and potentially other metadata associated with the files or other objects in the local workspace maintained in the local data storage element 304 to identify a subset of files or objects that were changed (e.g., created, deleted, or otherwise modified) during execution of the assigned step and then generates a corresponding snapshot 208 associated with the assigned step that includes data or information associated with that subset of files or other objects changed by the assigned step. In this regard, the snapshot 208 for the assigned step may be realized as an archive file that includes only that subset of files or other objects changed by the assigned step and excludes any data or information associated with files or other objects that were not changed or modified by the assigned step.

In exemplary implementations, the step execution service 316 at the worker computing system 300 uses copy-on-write when making changes to any files or other objects in the local workspace maintained in the local data storage element 304. Thus, whenever execution of the assigned step results in a change to a file or other object associated with a downloaded preceding step snapshot 208, the step execution service 316 duplicates or otherwise creates a new instance of that file or object in the local data storage element 304 before writing any changes to that copied instance of that file or object. Thereafter, based on the more recent timestamp associated with modifications to that copied object relative to the originally downloaded instance of that object, the object changelog uploading service 318 identifies changes with respect to that copied object in connection with the execution of the assigned step and includes or otherwise incorporates data or information associated with that copied object in the archive file for the new snapshot 208 associated with the assigned step.

Referring to FIGS. 2-3, after completing execution of the assigned step, the worker computing system 206, 300 may be configured to provide a corresponding notification to the workflow management system 204 that the worker computing system 206, 300 has completed execution of an assigned step successfully without detecting any potential conflicts and is available to be assigned another step of the workflow. When a subsequent step of the workflow is assigned to the respective worker computing system 206, 300, the step retrieval service 310 and the snapshot retrieval service 312 effectively reinitialize the local workspace maintained in the local data storage element 304 to reflect any preceding steps as described above, including any steps previously executed by that respective worker computing system 206, 300. In this regard, rather than persist the local workspace in the local data storage element 304, the snapshot retrieval service 312 dynamically updates the local workspace in a stateful manner that reflects the current state of distributed execution of the workflow that includes changes by other instances of the worker computing system 206, 300 in addition to preceding changes made by the respective worker computing system 206, 300. When all of the steps of the user-defined workflow have been executed successfully, the workflow management system 204 may automatically provide a user notification back to the client device 202 (e.g., via the client application 109 and network 110) that the workflow has completed, for example, by providing a completion status notification to the user via a command line application, chat application, or other suitable application at the client device 202. In some implementations, the workflow management system 204 also generates or otherwise provides a summary graph that includes information identifying the steps that were executed as part of the workflow.

Figure 4:
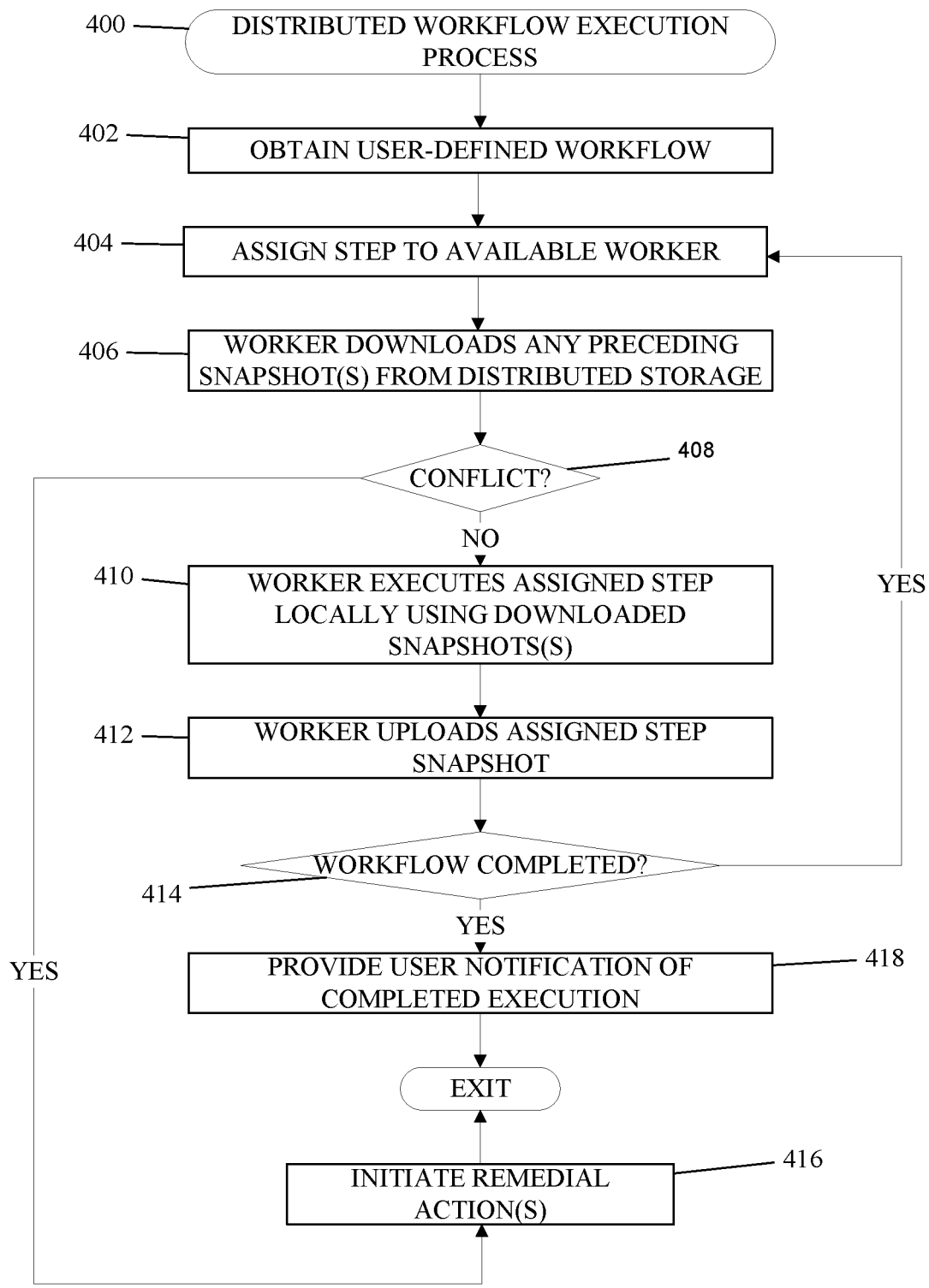
FIG. 4 is a flow chart of an exemplary distributed workflow execution process suitable for implementation by the CI system of FIG. 2 in accordance with one or more exemplary implementations.

FIG. 4 depicts an exemplary flow diagram of a distributed workflow execution process 400 suitable for implementation by a CI system or other computing system to execute steps of a workflow in a parallelizable and distributed manner using stateful, local workspaces. For illustrative purposes, the following description may refer to elements mentioned above in connection with FIGS. 1-3. It should be appreciated that the distributed workflow execution process 400 may include any number of additional or alternative tasks, the tasks need not be performed in the illustrated order and/or the tasks may be performed concurrently, and/or the distributed workflow execution process 400 may be incorporated into a more comprehensive procedure or process having additional functionality not described in detail herein. Moreover, one or more of the tasks shown and described in the context of FIG. 3 could be omitted from a practical implementation of the distributed workflow execution process 400 as long as the intended overall functionality remains intact.

Referring to FIG. 4, with continued reference to FIGS. 1-3, in exemplary implementations, the distributed workflow execution process 400 allows users to define and execute stateful workflows with parallel steps (including nested parallel steps within parallel steps) in a distributed manner using local disk I/Os for improved performance while providing collision protection and handling for parallel steps writing to the same file, object or other location associated with a workspace to avoid corrupted results or data. For example, a user may define a workflow for a CI system to process source code to create packages and files created by compilers, and potentially create test results that need to be processed as well, where read and write state the needs to carry over following steps and the resulting files can be relatively high in quantity and relatively large in size, while also being created dynamically in a manner that cannot be predicted by the CI system. The distributed workflow execution process 400 also enables the workflow to be re-executed or reinitiated from any step or point within a workflow, such that users are not required restart execution of the entire workflow and can retry steps from points at which they failed, thereby saving time relative to repeating the entire workflow.

The illustrated implementation of the distributed workflow execution process 400 begins by receiving or otherwise obtaining the user-defined workflow to be executed and assigning the user-defined steps of the user-defined workflow to available workers for execution in accordance with the user-defined sequence and manner of execution of those user-defined steps (tasks 402, 404). For example, as described above, a user may utilize a client application 109 at a client device 108, 202 to define the steps the user wants to be run, the order or sequence in which those steps should be executed, and whether or not various ones of those steps are capable of being executed in parallel with other steps (e.g., by enabling or defining an attribute parallel=true), and then upload, to the workflow management system 204 over the network 110, a corresponding workflow instruction file that includes an acyclic directed graph data structure or other workflow execution configuration metadata defining the steps and sequencing for the workflow along with data or other information identifying the source code, file or other subject of the workflow to be processed. The workflow management system 204 stores or otherwise maintains the configured step metadata 210 corresponding to the acyclic directed graph data structure or other user-defined configurations for the step execution and utilizes the configured step metadata 210 to assign individual steps of the workflow to different ones of the available worker computing systems 206 in the appropriate sequence or order. In this regard, in exemplary implementations, the workflow management system 204 assigns parallel steps to different machines in a manner that allows the steps to be executed using independent CPU cycles with increased local memory available to avoid resource contention at a respective worker computing system 206. Depending on the implementation, the workflow management system 204 and/or the worker computing systems 206 utilize the configured step metadata 210 to delay or otherwise manage execution of steps in a manner that ensures the user-defined sequence or ordering of steps is followed, for example, by ensuring each of a set of parallel steps (e.g., a set of parallel testing steps) is completed prior to assigning or initiating execution of a subsequent step of the user-defined workflow (e.g., a packaging step) that is intended to follow or otherwise be contingent on completion of those preceding steps.

The illustrated distributed workflow execution process 400 proceeds with the individual worker computing systems utilizing the configured step metadata associated with their respective assigned steps to download or otherwise retrieve snapshots of any preceding steps from a distributed object storage to its respective local memory before analyzing the snapshots of preceding steps for potential conflicts (tasks 406, 408). In the absence of any preceding steps, for example, for the initial step of the workflow, the workflow execution process 400 proceeds with the worker computing system executing that initial assigned step using its local memory and then automatically uploading a snapshot of changes to objects that occurred at the worker computing system during execution of the initial assigned step (tasks 410, 412). After completing execution of an assigned step, a worker computing system 206 may provide a corresponding notification of its availability back to the workflow management system 204, which, in turn, may assign another step of the workflow to that worker computing system 206 to repeat the loop defined by tasks 406, 408, 410, 412 and 414 until the execution of the user-defined workflow is completed and there are not additional unperformed steps to be assigned.

As described above, upon assignment of a step for execution, the snapshot retrieval service 312 associated with a respective worker computing system 206, 300 downloads any preceding step snapshots 208 from a distributed object storage element 230 to its local data storage element 304 and then a conflict detection service 314 compares or otherwise analyzes the contents of the respective preceding step snapshots 208 with respect to one another to detect or otherwise identify any potential conflicts between preceding steps. In this regard, the conflict detection service 314 utilizes the timestamps and potential other metadata associated with the objects contained with in the respective preceding step snapshots 208 to identify any common objects where two or more preceding steps concurrently made changes or modifications with respect to those common objects while those two or more preceding steps were executing in parallel or otherwise concurrently with respect to one another. In the absence of any conflicts, the step execution service 316 at the respective worker computing system 206, 300 utilizes the downloaded snapshots 208 to initialize its local workspace maintained using its local data storage element 304 to reflect the current execution state of the workflow after execution of the preceding steps before executing or otherwise performing its assigned step within the local workspace using copy-on-write for object changes. In this regard, any operations or changes to objects performed in connection with execution of the assigned step within the local workspace reflect or otherwise account for changes from preceding steps of the workflow. Once execution of the assigned step is completed, the object changelog uploading service 318 automatically generates an archive file of changes to files or other objects maintained in the local data storage element 304 that are associated with the execution of the assigned step within the local workspace and then automatically uploads the archive file to the distributed object storage element 230 (e.g., to the appropriate path or location defined by the configured step metadata 210 or other instructions from the workflow management system 204) as a new snapshot 208 of a set of changes to a corresponding set of objects associated with execution of the assigned step to be utilized by a subsequent step of the workflow (e.g., for conflict detection and initializing its workspace). After successfully uploading the new snapshot 208 for the assigned step to the distributed object storage element 230, the object changelog uploading service 318 may trigger a corresponding available notification that is automatically transmitted or otherwise provided back to the workflow management system 204 to receive a new step for execution.

Still referring to FIG. 4, in response to detecting a potential conflict, in exemplary implementations, the distributed workflow execution process 400 automatically initiates one or more remedial actions to mitigate the potential conflict (task 416). For example, in one or more implementations, the worker computing system 206, 300 detecting a conflict condition automatically transmits or otherwise provides a corresponding conflict notification to the workflow management system 204 that identifies the particular steps of the workflow associated with the conflict, the objects associated with the conflict and/or potentially other information that may be utilized by the user to manually debug or otherwise resolve the conflict. In response, the workflow management system 204 may automatically generate or otherwise provide a corresponding user notification or other graphical user interface (GUI) display at the client device 108, 202 (e.g., within the client application 109) that includes indication of the potential conflict, for example, by providing a graphical indication of the conflict along with displaying identifying information associated with the particular workflow steps and/or object(s) associated with the conflict. In some implementations, the workflow management system 204 and/or the worker computing system 206, 300 may generate an error log in a data storage element 205, 230 that can be accessed or otherwise retrieved by the client device 108, 202, the workflow management system 204 and/or another worker computing system 206, 300 for analysis to identify potentially corrupted files or objects.

Depending on the implementation, the user may configure one or more steps of the user-defined workflow to automatically terminate or exit without completing execution of the respective step, while one or more steps of the user-defined workflow may be configured with conflict resolution configuration information capable of being utilized by the conflict detection service 314 to automatically initiate a remedial action to resolve the conflict at the respective worker computing system 206, 300. Thus, rather than terminating execution of the assigned step, the user may define conflict resolution configuration information that allows the conflict detection service 314 to ignore conflicts (or conflicts with respect to particular objects) or otherwise arbitrate and resolve conflicts between different steps making changes to a common object. For example, the user may define configured step metadata 210 for the assigned step that causes the conflict detection service 314 to automatically keep or select one version of that common file or object, for example, by configuring the assigned step to initialize and execute using the most recently written changes, using the least recently written changes, using the changes associated with a particular one of the preceding steps, and/or the like. In such implementations, the conflict detection service 314 may still be configured to automatically log the conflict and provide corresponding notification to the workflow management system 204 to enable the user to be notified of a potential conflict with respect to the user-defined workflow even though execution of the workflow may continue and complete, thereby notifying the user of the possibility of data corruption in the completed results of executing the workflow.

Referring to FIG. 4, after completing execution of the user-defined workflow, in exemplary implementations, the distributed workflow execution process 400 automatically generates or otherwise provides a corresponding notification to the user that execution of the user-defined workflow has been completed (task 418). For example, the workflow management system 204 may automatically generate or otherwise provide a GUI display or other user notification within a client application 109 at a client device 108, 202 that includes information identifying that execution of the user-defined workflow has been completed, the results of the user-defined workflow, and/or the like, such as a push notification via a chat application, a messaging application, or another suitable communication application. For example, a GUI display or other user notification generated within a client application 109 at a client device 108, 202 may include information identifying any artifacts that were sent or are ready to be sent to production repositories or other production environments, test results that were sent or are ready to be sent to a system for aggregating and displaying test results, any calls to a downstream system (e.g., part of a CI/CD pipeline) that were made or are ready to be made, and/or the like. On the other hand, when one or more of the steps of the workflow fails, the workflow management system 204 may be configurable to provide a troubleshooting GUI display that includes one or more graphical representations of which steps were executed successfully, which step(s) failed, and potentially graphical representations of prior workflow runs to analyze the relationship between the most recent execution of the workflow and prior attempts to execute the workflow. For example, the troubleshooting GUI display of the steps of the workflow, with the respective steps being depicted in connection with any respective logs that were emitted or otherwise generated in connection with that step for analysis.

It should be noted that although the subject matter is described herein primarily in the context of conflict detection (e.g., task 408) by a conflict detection service 314 at a worker node 300 prior to execution of a respective workflow step, in alternative implementations, the conflict detection may be performed by a conflict detection service implemented at the workflow management system 204 or another computing system associated with the distributed storage 230 (e.g., a server of a distributed object storage system) that is configurable to analyze uploaded snapshots to detect or otherwise identify a conflict condition when an uploaded snapshot corresponds to a particular path or location in the distributed storage 230. For example, the object changelog uploading service 318 may provide a list or other indication of the paths that are to be written to the file system at the distributed storage 230 to the workflow management system 204 or another computing system associated with the distributed storage 230, where the workflow management system 204 or another computing system associated with the distributed storage 230 analyzes the paths to detect or otherwise identify a path collision when a path to be written to the distributed storage 230 matches or otherwise corresponds to the same path that was previously or concurrently written to by a preceding or parallel step of the workflow. In this regard, detecting conflicts during upload may save time by causing execution of the workflow to fail earlier (e.g., before the conflict would otherwise be detected at a worker node executing a following step of the workflow) and reduce the costs associated with snapshot storage (e.g., rather than writing the full snapshot of a step to the distributed storage 230 once a conflict is identified).

Figure 5:
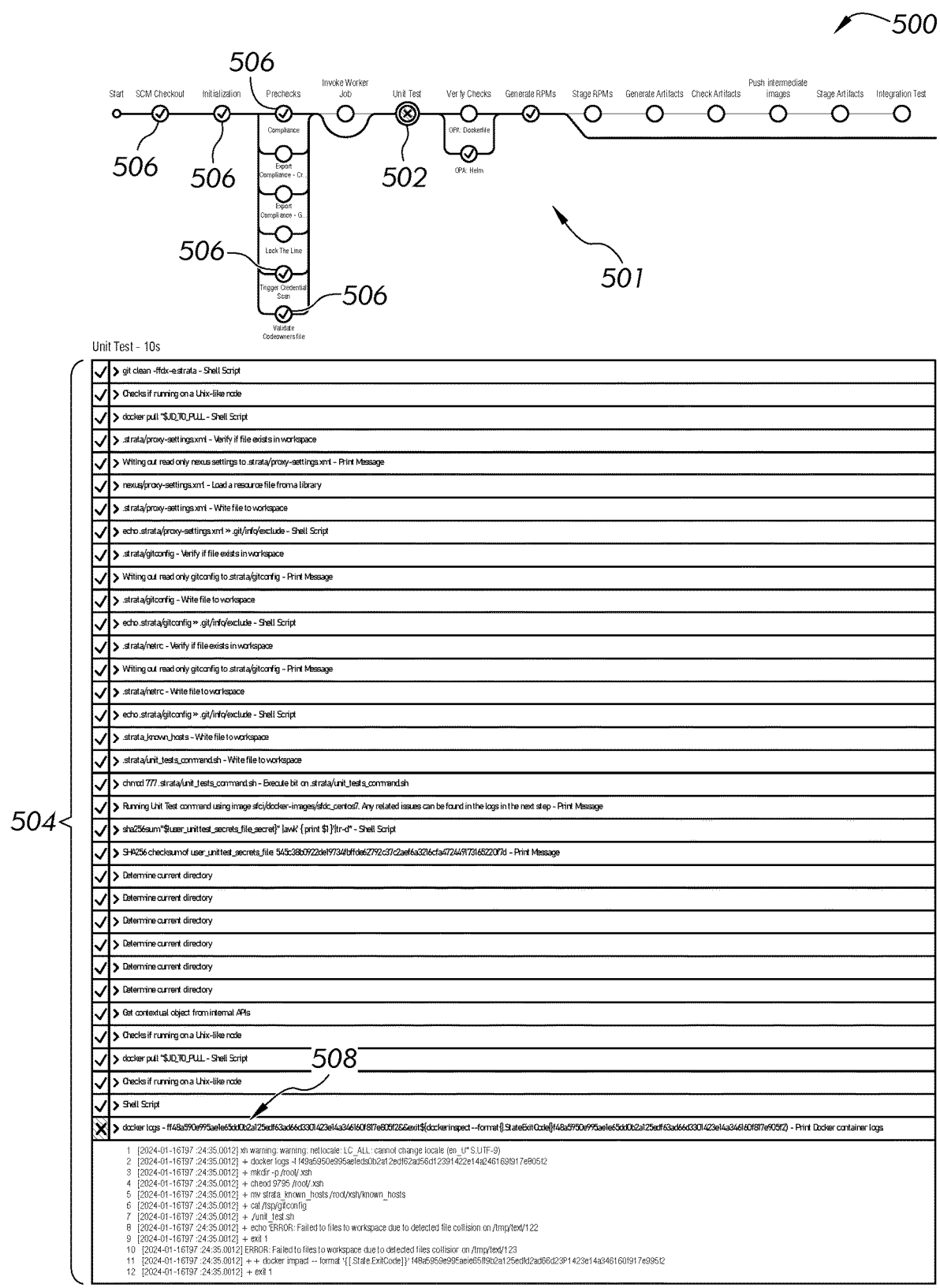
FIG. 5 depicts an exemplary implementation of a workflow management graphical user interface (GUI) display suitable for presentation in connection with the distributed workflow execution process of FIG. 4 in one or more implementations.

FIG. 5 depicts an exemplary workflow management GUI display 500 suitable for presentation within a client application 109 at a client device 108, 202 that includes graphical indication 502 of a conflict condition identifying the particular workflow step associated with the conflict along with detailed information 504 pertaining to execution of that particular step for analysis. For example, in the illustrated implementation, the workflow management GUI display 500 includes a graphical representation 501 of a nonlinear workflow as a graph data structure depicted within an upper portion of the GUI display 500, where nodes 506 of the workflow data structure 501 corresponding to workflow steps that completed execution successfully are rendered using a visually distinguishable characteristic (e.g., green color) conveying successful execution that is different from another visually distinguishable characteristic (e.g., red color) utilized to render the node 502 corresponding to the particular workflow step associated with the conflict (e.g., file collision error). In this regard, when the unsuccessful workflow step node 502 is selected, the workflow management system 204 may automatically populate the lower portion of the GUI display 500 with detailed information including, but not limited to, a listing of the objects that were successfully created during execution of the selected workflow step along with graphical indicia of the object(s) where the conflict condition was detected. For example, successfully created objects may be rendered within a listing in the detailed information portion 504 using a visually distinguishable characteristic (e.g., green color) that conveys a successful outcome, with the entry 508 for the conflicted object within the listing being rendered using a different visually distinguishable characteristic (e.g., red color) that conveys an unsuccessful outcome or potential corruption with respect to that object. Selection of the conflicted object entry 508 may cause the workflow management system 204 to provide a command line interface or other command line information that includes information logged during execution of the workflow step with respect to that object which can be utilized by the user to debug the workflow.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as services) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
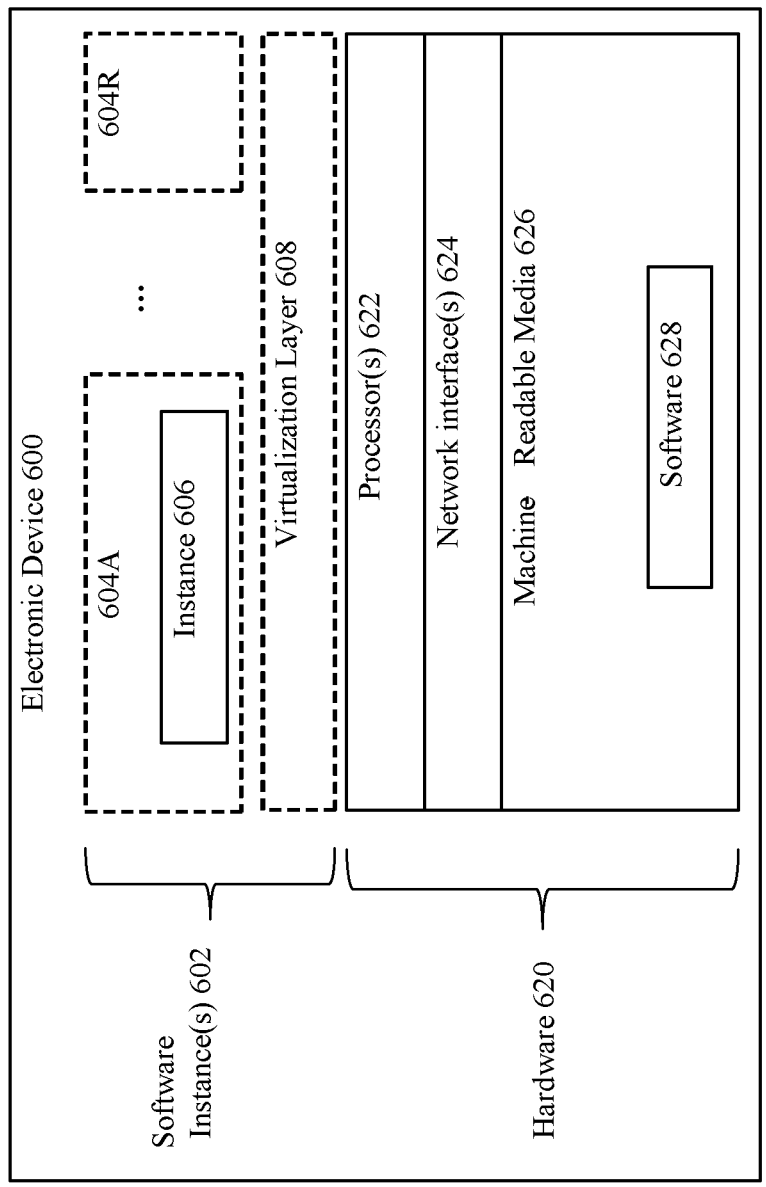
FIG. 6A is a block diagram illustrating an electronic device according to some exemplary implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients, server-side services and client-side services may be implemented in one or more electronic devices 600. In one implementation: 1) each of the clients is implemented in a separate one of the electronic devices 600 (e.g., in end user devices where the software 628 represents the software to implement clients to interface directly and/or indirectly with the server-side services and/or client-side services (e.g., software 628 represents a web browser, a native client, a portal, a command-line interface, and/or an application programming interface (API) based upon protocols such as Simple Object Access Protocol (SOAP), Representational State Transfer (REST), etc.)); 2) the server-side services and/or client-side services is implemented in a separate set of one or more of the electronic devices 600 (e.g., a set of one or more server devices where the software 628 represents the software to implement the server-side services and/or client-side services); and 3) in operation, the electronic devices implementing the clients and the server-side services and/or client-side services would be communicatively coupled (e.g., by a network) and would establish between them (or through one or more other layers and/or or other services) connections for submitting requests to the server-side services and/or client-side services. Other configurations of electronic devices may be used in other implementations.

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where computer virtualization is used, during operation, an instance of the software 628 is executed within the software container 604A on the virtualization layer 608. In electronic devices where computer virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Figure 6B:
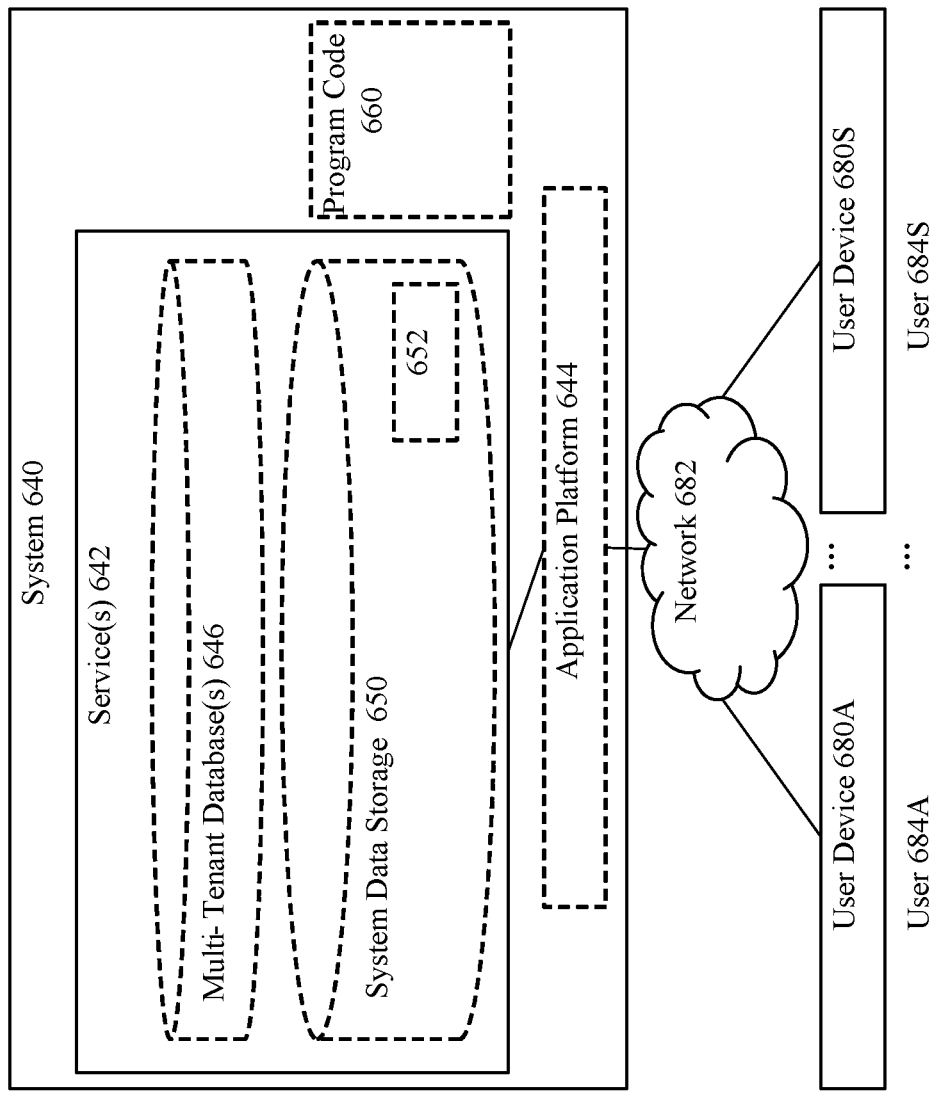
FIG. 6B is a block diagram of a deployment environment according to some exemplary implementations.

FIG. 6B is a block diagram of a deployment environment according to some example implementations. A system 640 includes hardware (e.g., a set of one or more server devices) and software to provide service(s) 642, including server-side services and/or client-side services. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the server-side services and/or client-side services, may be coded using Procedural Language/Structured Object Query Language (PL/SQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP) or HTTP Secure (HTTPS), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of executing a workflow including a plurality of steps using a plurality of computing systems, the method comprising:
receiving, at a first computing system of the plurality of computing systems, indication of an assigned step of the plurality of steps;
downloading, to local storage at the first computing system over a network, a snapshot of changes from a preceding step of the plurality of steps from a distributed storage on the network, wherein the snapshot comprises data indicative of the changes to a first set of one or more objects associated with execution of the preceding step by a respective computing system of the plurality of computing systems;
performing, by the first computing system, the assigned step using the data indicative the changes to the one or more objects associated with execution of the preceding step to generate a second snapshot of second changes associated with the assigned step comprising second data indicative of the second changes to a second set of one or more objects associated with execution of the assigned step; and
uploading, by the first computing system, the second snapshot of second changes associated with the assigned step to the distributed storage.

2. The method of claim 1, wherein performing the assigned step comprises:
initializing a local workspace for the assigned step maintained in the local storage using the changes to the one or more objects associated with execution of the preceding step; and
executing commands associated with the assigned step within the local workspace resulting in the second changes to the second set of one or more objects within the local workspace.

3. The method of claim 2, further comprising writing the second changes to the second set of one or more objects within the local workspace to the local storage using copy-on-write.

4. The method of claim 2, wherein uploading the second snapshot comprises:
creating an archive file at the first computing system including the second set of one or more objects from the local workspace maintained in the local storage; and
writing the archive file to a location at the distributed storage corresponding to the assigned step.

5. The method of claim 1, further comprising:
downloading, to the local storage at the first computing system, a third snapshot of third changes from a second preceding step of the plurality of steps from the distributed storage on the network, wherein the third snapshot comprises additional data indicative of third changes to a third set of one or more objects associated with execution of the second preceding step; and
analyzing, at the first computing system, the data associated with the snapshot of the changes and the additional data associated with the third snapshot of the third changes to identify a common object common to each of the first set and the third set.

6. The method of claim 5, further comprising automatically initiating a remedial action in response to detecting the common object common to each of the first set and the third set.

7. The method of claim 6, wherein automatically initiating the remedial action comprises providing a user notification including information identifying at least one of the common object, the preceding step and the second preceding step.

8. The method of claim 6, wherein:
automatically initiating the remedial action comprises automatically selecting, at the first computing system, one of the first changes to the common object from the snapshot and the third changes to the common object from the third snapshot; and
performing the assigned step comprises initializing a local workspace for the assigned step maintained in the local storage using the selected one of the first changes to the common object from the snapshot and the third changes to the common object from the third snapshot.

9. A method of executing a workflow including a plurality of steps using a plurality of computing systems, the method comprising:
receiving, at a first computing system of the plurality of computing systems, indication of an assigned step of the plurality of steps; and
prior to executing the assigned step at the first computing system:
downloading, to local storage at the first computing system over a network, a plurality of snapshots from a distributed storage on the network, wherein each snapshot of the plurality of snapshots comprise respective data indicative changes associated with execution of a respective preceding step of the plurality of steps by a respective computing system of the plurality of computing systems;
analyzing, at the first computing system, the respective data associated with the plurality of snapshots to identify a first change to a first object associated with execution of a first step of the plurality of steps and a second change to the first object associated with execution of a second step of the plurality of steps concurrent to execution of the first step; and
initiating a remedial action in response to the first and second changes associated with the first object common to execution of the first and second steps.

10. The method of claim 9, further comprising executing the assigned step at the first computing system in an absence of first and second changes associated with the first object common to execution of the first and second steps.

11. The method of claim 9, further comprising performing, by the first computing system, the assigned step using the respective data associated with the plurality of snapshots associated with execution of one or more preceding steps.

12. The method of claim 11, further comprising:
generating, by the first computing system, a new snapshot of additional changes associated with the assigned step comprising additional data indicative of the additional changes to one or more objects associated with execution of the assigned step; and
uploading, by the first computing system, the new snapshot of additional changes associated with the assigned step to the distributed storage.

13. The method of claim 12, wherein performing the assigned step comprises:
initializing a local workspace for the assigned step maintained in the local storage using the respective data associated with the plurality of snapshots associated with execution of the one or more preceding steps; and executing commands associated with the assigned step within the local workspace resulting in the additional changes to a set of one or more objects within the local workspace.

14. The method of claim 13, wherein uploading the new snapshot comprises:

creating an archive file at the first computing system including the set of one or more objects from the local workspace maintained in the local storage; and writing the archive file to a location at the distributed storage corresponding to the assigned step.

15. The method of claim 9, wherein at least one preceding step of the plurality of steps was executed at a respective computing system of the plurality of computing systems that is distinct from the first computing system.

16. The method of claim 9, wherein initiating the remedial action comprises automatically providing a user notification including information identifying at least one of the first object, the first step and the second step.

17. The method of claim 9, wherein initiating the remedial action comprises automatically selecting the first change to the first object associated with execution of the first step.

18. The method of claim 17, further comprising:

initializing, at the first computing system, a local workspace for the assigned step maintained in the local storage using the first change to the first object associated with execution of the first step;

executing, at the first computing system, one or more commands associated with the assigned step within the local workspace resulting in additional changes to the first object within the local workspace;

generating, by the first computing system, a new snapshot associated with the assigned step comprising additional data indicative of the additional changes to the first object associated with execution of the assigned step; and uploading, by the first computing system, the new snapshot to the distributed storage.

19. The method of claim 18, further comprising writing the additional changes to the first object within the local workspace to the local storage using copy-on-write prior to generating the new snapshot.

20. At least one non-transitory machine-readable storage medium that provides instructions that, when executed by at least one processor, are configurable to cause the at least one processor to perform operations comprising:

receiving, at a first computing system of a plurality of computing systems, indication of an assigned step of a plurality of steps of a workflow;

downloading, to local storage at the first computing system over a network, a snapshot of changes from a preceding step of the plurality of steps from a distributed storage on the network, wherein the snapshot comprises data indicative of the changes to a first set of one or more objects associated with execution of the preceding step by a respective computing system of the plurality of computing systems;

performing, by the first computing system, the assigned step using the data indicative the changes to the one or more objects associated with execution of the preceding step to generate a second snapshot of second changes associated with the assigned step comprising second data indicative of the second changes to a second set of one or more objects associated with execution of the assigned step; and uploading, by the first computing system, the second snapshot of second changes associated with the assigned step to the distributed storage.

\* \* \* \* \*